(12) United States Patent
Seok

(10) Patent No.: US 9,900,865 B2
(45) Date of Patent: Feb. 20, 2018

(54) METHOD AND APPARATUS FOR SUB-CHANNEL SELECTIVE ACCESS IN WIRELESS LAN SYSTEM

(71) Applicant: LG ELECTRONICS INC., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/037,022

(22) Filed: Sep. 25, 2013

(65) Prior Publication Data

US 2014/0086200 A1   Mar. 27, 2014

Related U.S. Application Data

(60) Provisional application No. 61/706,081, filed on Sep. 26, 2012, provisional application No. 61/709,951, filed on Oct. 4, 2012, provisional application No. 61/716,595, filed on Oct. 21, 2012, provisional application No. 61/805,493, filed on Mar. 26, 2013, provisional application No. 61/806,381, filed on Mar. 28, 2013.

(51) Int. Cl.
*H04W 72/02* (2009.01)
*H04L 5/00* (2006.01)
*H04W 74/00* (2009.01)

(52) U.S. Cl.
CPC ............. *H04W 72/02* (2013.01); *H04L 5/003* (2013.01); *H04L 5/0094* (2013.01); *H04L 5/0096* (2013.01); *H04W 74/006* (2013.01)

(58) Field of Classification Search
CPC .. H04W 72/02; H04W 74/006; H04L 5/0096; H04L 5/0094; H04L 5/003
See application file for complete search history.

(56) References Cited

U.S. PATENT DOCUMENTS

2007/0298742 A1* 12/2007 Ketchum et al. .......... 455/186.1
2008/0043610 A1    2/2008 Li et al.
(Continued)

FOREIGN PATENT DOCUMENTS

CN    101479958 A    7/2009
KR    100990545 B1   10/2010
(Continued)

OTHER PUBLICATIONS

Park, et al.: "Frequency Selective Transmission", IEEE 11-12/1338r0, Nov. 12, 2012.

*Primary Examiner* — Kwang B Yao
*Assistant Examiner* — Moo Ryong Jeong
(74) *Attorney, Agent, or Firm* — Dentons US LLP

(57) ABSTRACT

Sub-channel selective access by a station (STA) in a wireless LAN (WLAN) system may involve receiving a frame including a channel list information field and a sounding indicator field, the latter indicating whether the frame is for sounding scheduling or for access point activity scheduling. If the sounding indicator field has a first value, the channel list information field indicates one or more sub-channels where there is a sounding transmission activity for the sub-channel selective access. If the sounding indicator field has a second value, the channel list information field indicates at least one sub-channel where a data transmission is permitted for the sub-channel selective access.

6 Claims, 18 Drawing Sheets

(56) References Cited

U.S. PATENT DOCUMENTS

| | | |
|---|---|---|
| 2010/0104327 A1 | 4/2010 | Handa et al. |
| 2010/0260138 A1* | 10/2010 | Liu ..................... H04L 5/0023 |
| | | 370/330 |
| 2011/0075607 A1* | 3/2011 | Kim et al. ................... 370/328 |
| 2011/0194542 A1 | 8/2011 | Kim et al. |
| 2011/0310834 A1* | 12/2011 | Seok ..................... H04W 74/06 |
| | | 370/329 |
| 2012/0014336 A1 | 1/2012 | Seok |
| 2012/0263090 A1* | 10/2012 | Porat et al. ................... 370/312 |

FOREIGN PATENT DOCUMENTS

| | | | |
|---|---|---|---|
| RU | 2300846 C2 | 6/2007 | |
| RU | 2304348 C2 | 8/2007 | |
| WO | 2010/024947 A1 | 3/2010 | |
| WO | WO 2010104327 A2 * | 9/2010 | ............ H04W 74/06 |
| WO | 2011/099729 A2 | 8/2011 | |
| WO | 2011/115449 A2 | 9/2011 | |
| WO | 2012/093794 A2 | 7/2012 | |
| WO | 2012/109369 A2 | 8/2012 | |

* cited by examiner

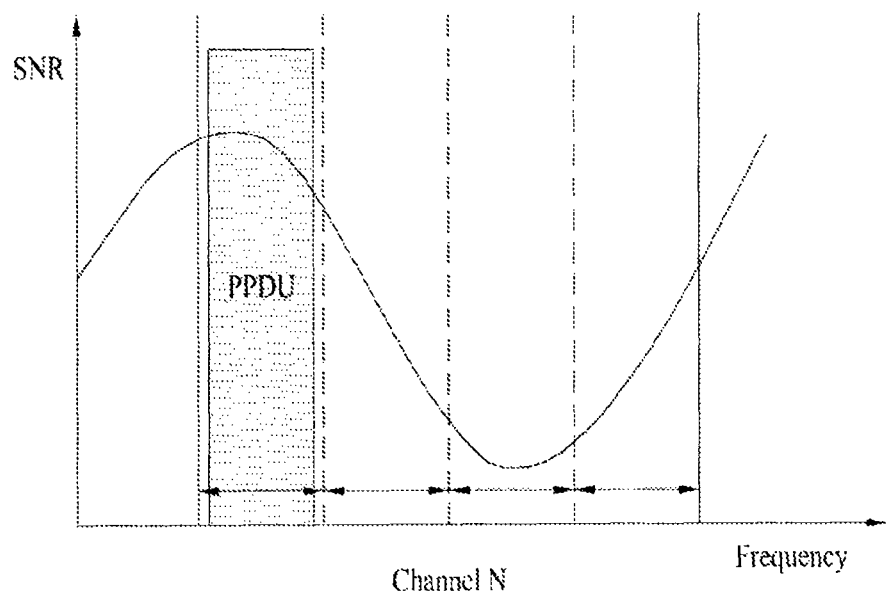

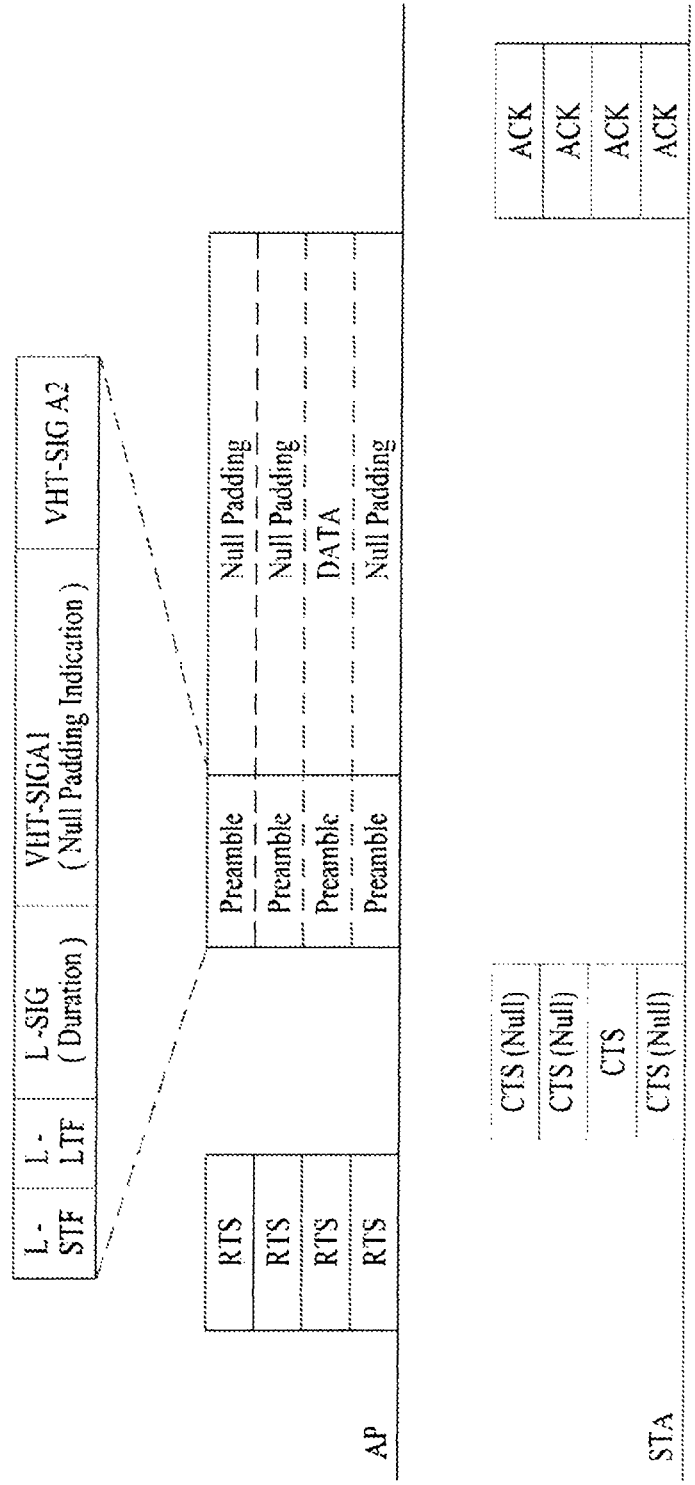

FIG. 16
| Frame Control | Duration (=Polled Chnnel Duration) | RA | BSSID (=TA) | Polled Channel | NDP Sounding | FCS |
|---|---|---|---|---|---|---|
| 2 octets | 2 octets | 6 octet | 6 octet | 1 octet | 1 octet | 4 octet |
FIG. 17
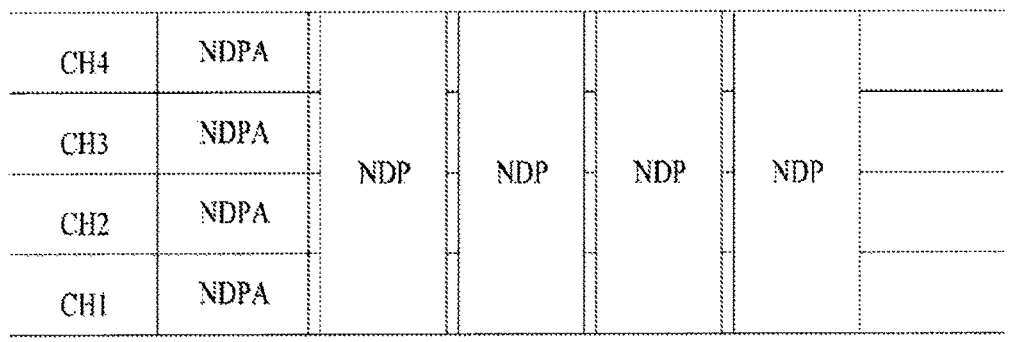
FIG. 18
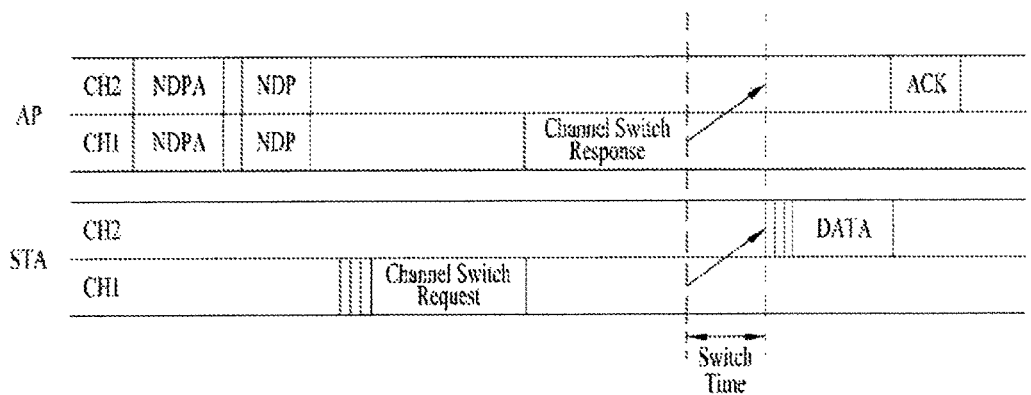

FIG. 19

| | | | | | | | PIFS | |
|---|---|---|---|---|---|---|---|---|
| | 1 | | | | | PIFS | ← | NDP |
| | 1 | | | | PIFS | ← NDP | | |
| | 1 | | | PIFS | ← NDP | | | |
| | 1 | | ← NDP | Sounding NDP Bandwidth = 2MHz | | | | |
| | 0 | | | | | | | |
| | 0 | | | | | | | |
| | 0 | | | | | | | |
| | 0 | Beacon | | | | | | |

Channel Activity Bitmap

FIG. 21

| | | | | |
|---|---|---|---|---|
| | 1 | | | |
| | 1 | PIFS | | |
| | 1 | →| NDP | Sounding NDP Bandwidth = 8MHz |
| | 1 | | | |
| | 0 | | | |
| | 0 | | | |
| | 0 | | | |
| | 0 | Beacon | | |

Channel Activity Bitmap

METHOD AND APPARATUS FOR SUB-CHANNEL SELECTIVE ACCESS IN WIRELESS LAN SYSTEM

This application claims the benefit of U.S. provisional application No. 61/706,081, filed on Sep. 26, 2012, U.S. provisional application No. 61/709,951, filed on Oct. 4, 2012, U.S. provisional application No. 61/716,595, filed on Oct. 21, 2012, U.S. provisional application No. 61/805,493, filed on Mar. 26, 2013, U.S. provisional application No. 61/806,381, filed on Mar. 28, 2013, which are hereby incorporated by reference as if fully set forth herein.

BACKGROUND OF THE INVENTION

Field of the Invention

The present invention relates to a wireless communication system, and more particularly to a method and apparatus for sub-channel selective access in a wireless LAN (WLAN) system.

Discussion of the Related Art

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, Institute of Electrical and Electronics Engineers (IEEE) 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

SUMMARY OF THE INVENTION

Accordingly, the present invention is directed to a method and apparatus for transmitting and receiving a frame including a partial association identifier (PAID) in a WLAN system that substantially obviate one or more problems due to limitations and disadvantages of the related art. Machine to Machine (M2M) communication technology has been discussed as next generation communication technology. A technical standard for supporting M2M communication in IEEE 802.11 WLAN has been developed as IEEE 802.11ah. M2M communication may sometimes consider a scenario capable of communicating a small amount of data at low speed in an environment including a large number of devices.

An object of the present invention is to provide a method and apparatus for enabling a device operating in a wireless LAN (WLAN) system to correctly perform/support efficient sub-channel selective access.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for performing sub-channel selective access by a station (STA) in a wireless LAN (WLAN) system includes: receiving a predetermined frame from an access point (AP); selecting at least one sub-channel when the predetermined frame includes channel list information for the sub-channel selective access, bandwidth information for the sub-channel selective access, and time information for the sub-channel selective access; and operating on the selected at least one sub-channel.

In another aspect of the present invention, a station (STA) for performing sub-channel selective access in a wireless LAN (WLAN) system includes: a transceiver; and a processor, wherein the processor receives a predetermined frame from an access point (AP), selects at least one sub-channel when the predetermined frame includes channel list information for the sub-channel selective access, bandwidth information for the sub-channel selective access, and time information for the sub-channel selective access, and operates on the selected at least one sub-channel.

The following description may be commonly applied to the embodiments of the present invention.

The at least one sub-channel may be selected from among one or more sub-channels indicated by the channel list information.

The channel list information may indicate one or more sub-channels in which access of the STA is allowed.

The bandwidth information may indicate a bandwidth of a frame allowed in at least one sub-channel indicated by the channel list information.

The predetermined frame may further include information indicating that transmission of the STA is allowed in at least one sub-channel indicated by the channel list.

The STA may operate in a primary channel when at least one of the channel list information, the bandwidth information, and time information of the sub-channel selective access is not contained in the predetermined frame.

The predetermined frame may be a CH-Poll frame or a beacon frame.

The predetermined frame may be transmitted from an access point (AP) associated with the STA.

The predetermined frame may further include information indicating whether null data packet (NDP) sounding is performed.

Based on at least one of the channel list information, the bandwidth information, and the information indicating whether the NDP sounding is performed, at least one of a sub-channel through which an NDP frame is transmitted subsequent to the predetermined frame, a bandwidth of the NDP frame, and a transmission time of the NDP frame may be determined.

If the information indicating whether the NDP sounding is performed indicates transmission of an NDP frame, the STA may determine a channel quality of a sub-channel using the NDP frame, and select the at least one sub-channel on the basis of the determined channel quality.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

FIG. 11 is a conceptual diagram illustrating a quality of service (QoS) of a frequency.

FIG. 12 is a conceptual diagram illustrating a CTS frame format according to an embodiment of the present invention.

FIG. 13 is a conceptual diagram illustrating a narrowband channel access mechanism including a sub-channel probe operation according to an embodiment of the present invention.

FIG. 16 is a conceptual diagram illustrating a CH-Poll frame format according to an embodiment of the present invention.

FIG. 17 is a conceptual diagram illustrating a method for transmitting multiple NDP frames to support sub-channel selective access according to an embodiment of the present invention.

FIG. 18 is a conceptual diagram illustrating a method for performing sub-channel selective access according to a modification example of the present invention.

FIG. 19 is a conceptual diagram illustrating a method for transmitting multiple NDP frames to support sub-channel selective access according to another example of the present invention.

FIG. 21 is a conceptual diagram illustrating a method for transmitting multiple NDP frames to support sub-channel selective access according to another example of the present invention.

DESCRIPTION OF SPECIFIC EMBODIMENTS

Figure 1:
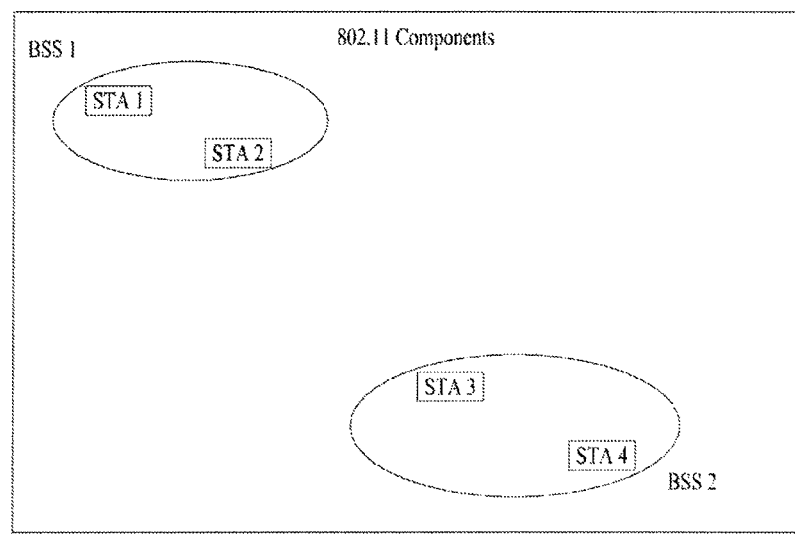
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
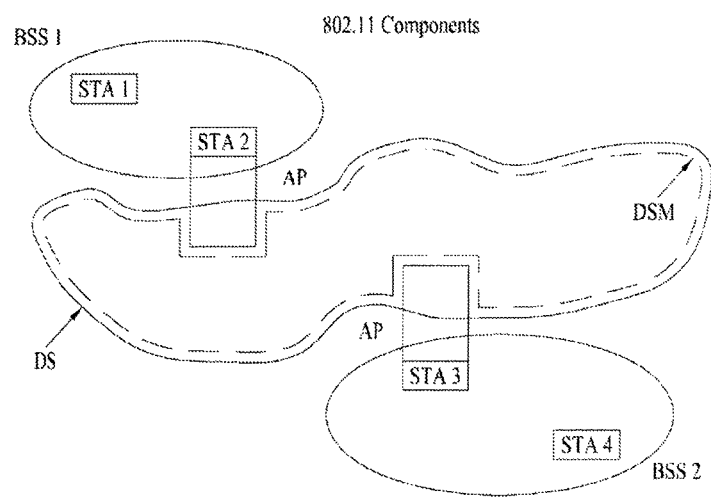
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
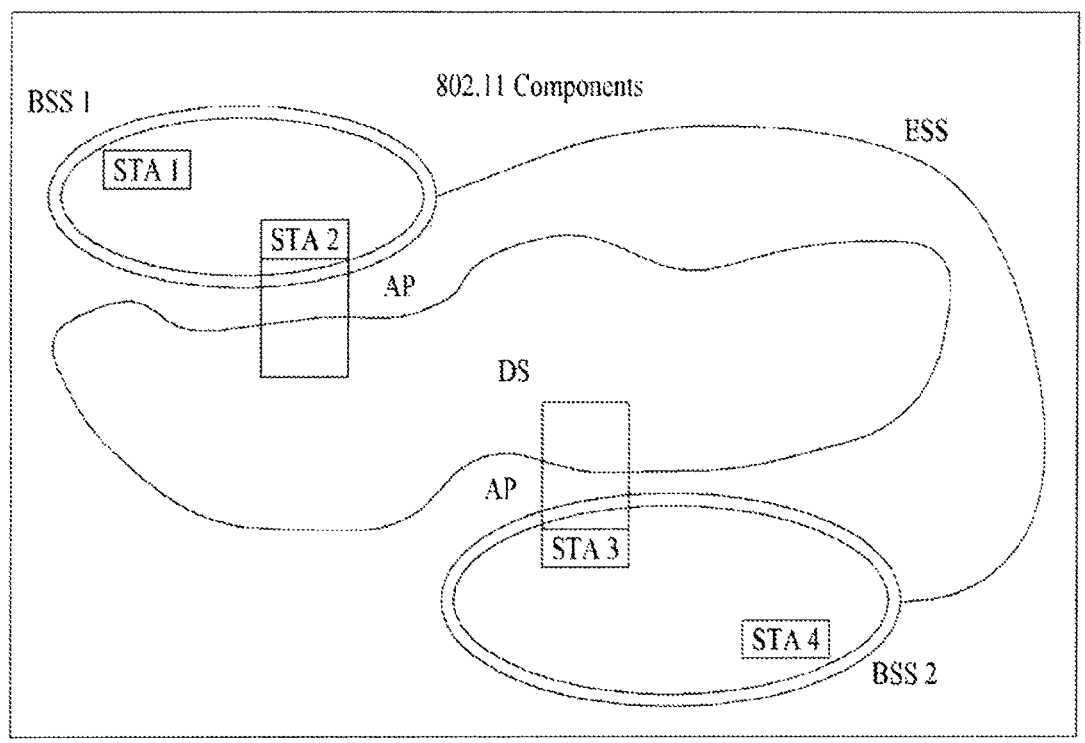
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
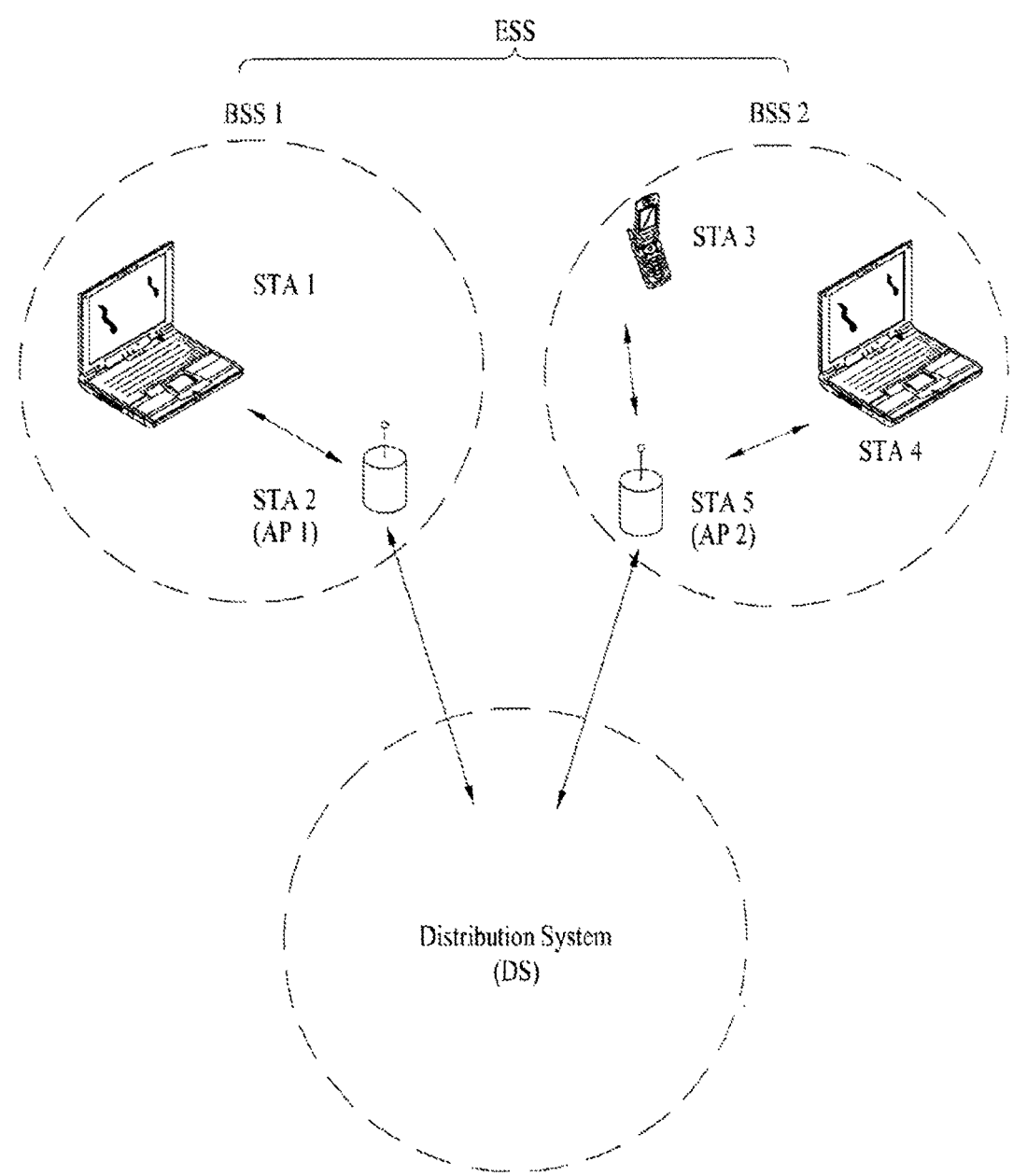
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
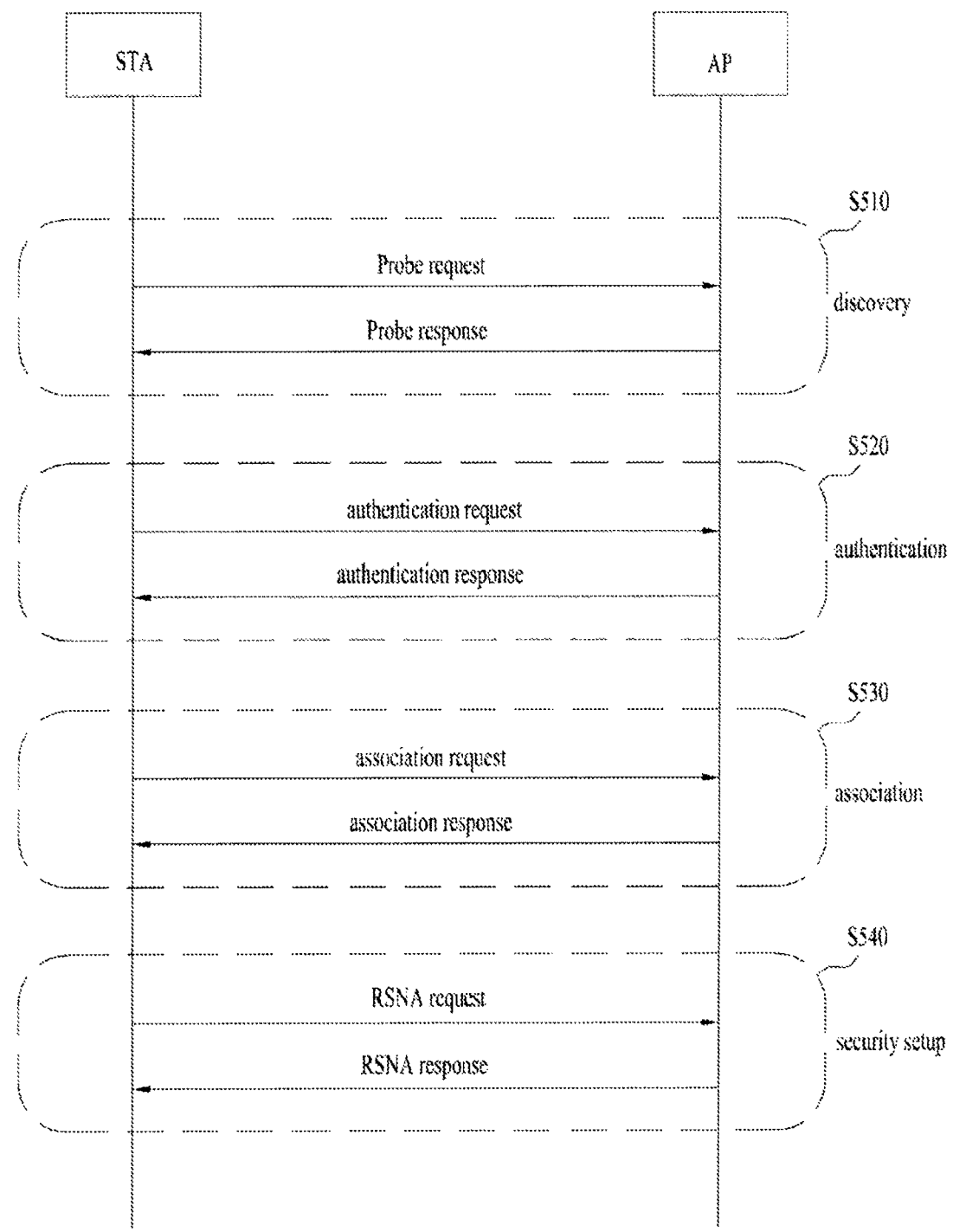
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to (or switches to) the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to (or switches to) another channel and records beacon frame information at each channel. The STA having received the beacon frame stores BSS-associated information contained in the received beacon frame, moves to (or switches to) the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

WLAN Evolution

WLAN standard is being developed as IEEE 802.11 standard. IEEE 802.11a and IEEE 802.11b use an unlicensed band in 2.4. GHz or 5 GHz. IEEE 802.11b may provide a transfer rate of 11 Mbps, and IEEE 802.11a may provide a transfer rate of 54 Mbps. IEEE 802.11g may use an Orthogonal Frequency Division Multiplexing (OFDM) at 2.4 GHz, and provide a transfer rate of 54 Mbps. IEEE 802.11n may use a Multiple Input Multiple Output (MIMO)-OFDM, and provide a transfer rate of 300 Mbps to four spatial streams. IEEE 802.11n may support a maximum of 40 MHz for a channel bandwidth, and support a High Throughput (HT) of a maximum of 540 Mbps.

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

In order to provide a throughput of 1 Gbps or higher to MAC SAP, an IEEE 802.11 VHT system requests a channel bandwidth of 80 MHz or higher and at least 8 spatial streams. In order to assign at least 1 Gbps to an aggregated throughput of a VHT BSS, multiple VHT non-AP STAs must simultaneously use a channel. In order to allow multiple VHT non-AP STAs to simultaneously use a channel, VHT AP STA may use either Space Division Multiple Access (SDMA) or MU-MIMO. In other words, simultaneous transmission/reception may occur between a VHT AP STA and multiple VHT non-AP STAs.

In addition to the conventional 2.4 GHz band or 5 GHz band, an IEEE 802.11af standard for defining operation of an unlicensed device in a TV whitespace (TVWS) band, such as an idle-state frequency band (for example, 54-698 MHz band) caused by digitization of analog TVs, is currently being developed. The TVWS band, which is a frequency band allocated to a broadcast TV, includes an Ultra High Frequency (UHF) band and a Very High Frequency (VHF) band. Specifically, the TVWS band is a frequency band which is allowed to be used by an unlicensed device under a condition that this does not hinder communication of a licensed device that operates in the frequency band. The licensed device may include a TV or a wireless microphone. The licensed device may be referred to as an incumbent user or a primary user. To overcome the problem of coexistence between unlicensed devices, a signaling protocol such as a common beacon frame, a frequency sensing mechanism, or the like may be required for the unlicensed devices.

Operations of all unlicensed devices are permitted in a band of 512~608 MHz and a band of 614~698 MHz. However, only communication between fixed devices is permitted in bands of 54~60 MHz, 76~88 MHz, 174~216 MHz, and 470~512 MHz. The term "fixed device" refers to a device that performs signal transmission only at a fixed location. An IEEE 802.11 TVWS terminal is an unlicensed device that operates, in the TVWS spectrum, using an IEEE 802.11 media access control (MAC) layer and a physical (PHY) layer.

An unlicensed device that desires to use the TVWS band should provide a function to protect licensed devices. Accordingly, the unlicensed device should check whether or not a licensed device is occupying the band before the unlicensed device starts signal transmission. To accomplish this, the unlicensed device may check whether or not the band is being used by a licensed device by performing spectrum sensing. Examples of the spectrum sensing mechanism include an energy detection scheme and a feature detection scheme. The unlicensed device may determine that a licensed device is using a specific band when the intensity of a received signal is greater than a specific level or when a DTV preamble is detected. Upon determining that a licensed device is operating in a channel that is immediately adjacent to a channel currently used by the unlicensed device, the unlicensed device should reduce transmission power.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). In addition, the STA operates according to a command received via downlink (i.e., a link from the AP to the non-AP STA) in M2M communication, such that data is reported through uplink (i.e., a link from the non-AP STA to the AP). M2M communication is mainly focused upon the communication scheme improved on uplink for transmission of the principal data. In addition, an M2M STA is mainly operated as a battery and the user may feel difficulty in frequently charging the M2M STA with electricity, such that battery consumption is minimized, resulting in an increased battery lifetime. In addition, the user may have difficulty in directly handling the M2M STA in a specific situation, such that a self-recovery function is needed. Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period, and at the same time can reduce power consumption of the STA.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
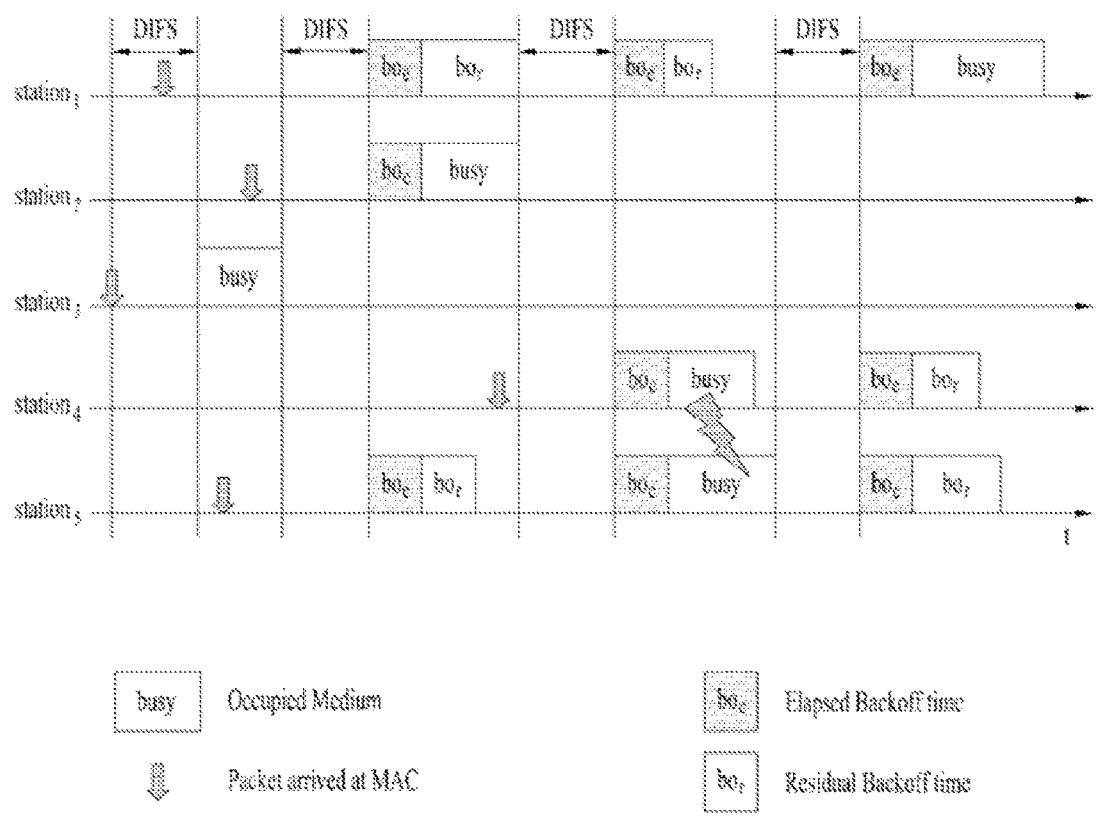
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit or defer medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
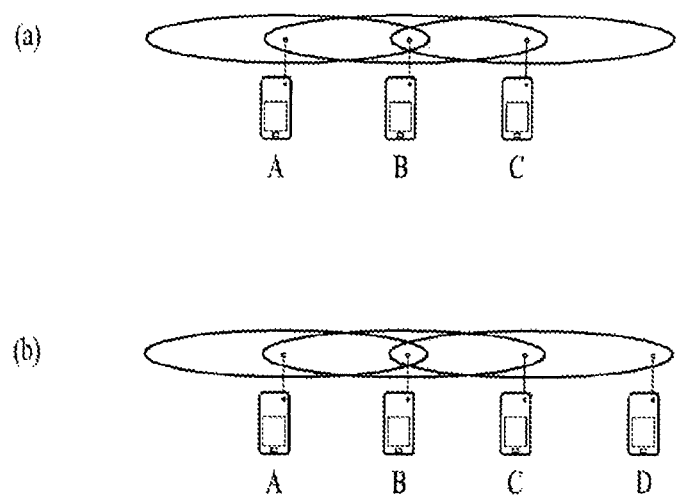
FIG. 7 is a conceptual diagram illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
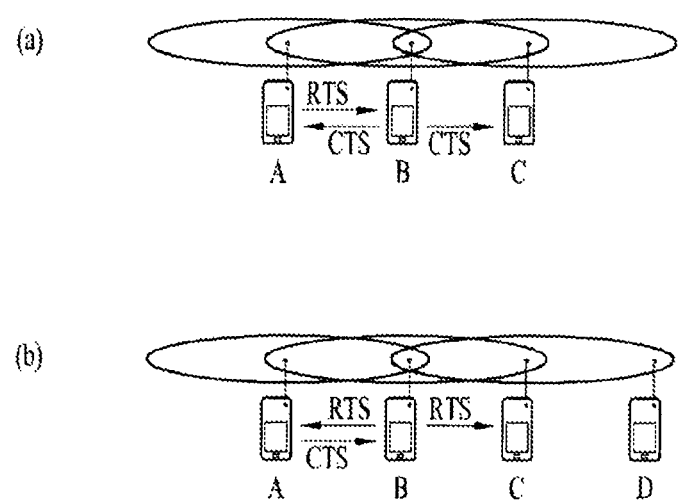
FIG. 8 is a conceptual diagram illustrating RTS (Request To Send) and CTS (Clear To Send).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Frame Format

Figure 9:
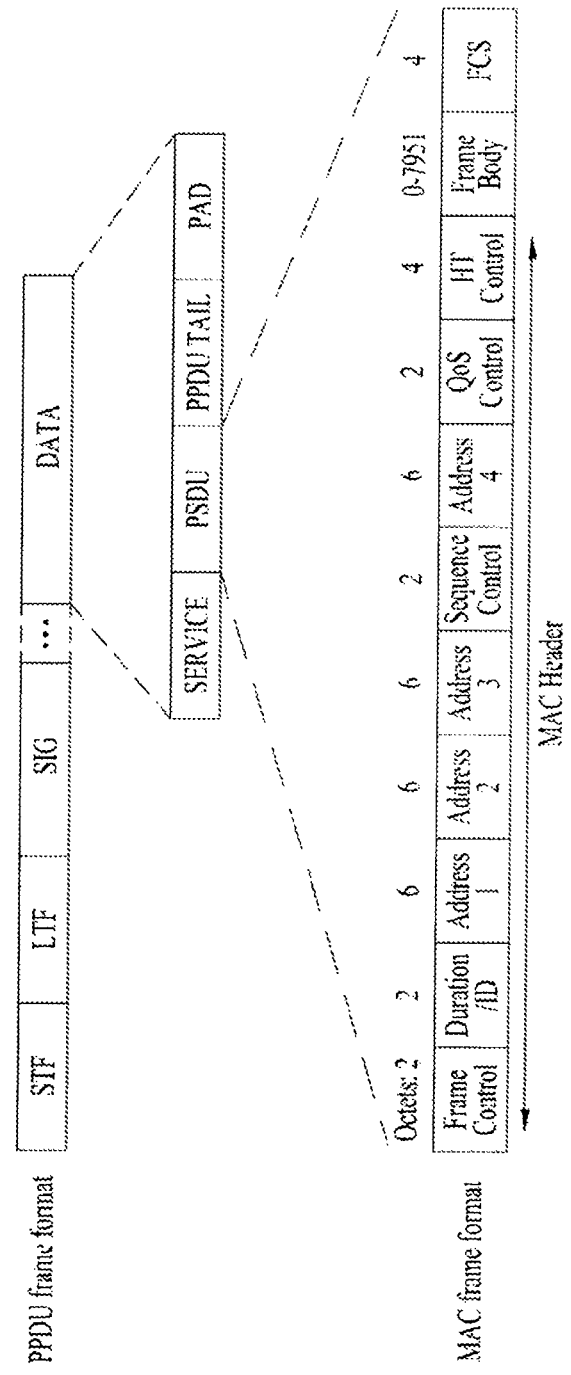
FIG. 9 is a conceptual diagram illustrating a frame structure for use in an IEEE 802.11 system.

FIG. 9 is a diagram for explaining an exemplary frame format used in IEEE 802.11 system.

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU (Protocol Data Unit) defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

MAC header may include a frame control field, a Duration/ID field, an address field, etc. The frame control field may include control information requisite for frame transmission/reception. The Duration/ID field may be established as a specific time for transmitting the corresponding frame or the like. Four address fields (Address 1, Address 2, Address 3, Address 4) may indicate a Basic Service Set Identifier (BSSID), a Source Address (SA), a Destination Address (DA), a Transmitter Address (TA), a Receiver Address (RA), etc. Only some parts from among four address fields may be included according to frame types.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

Sub-Channel Selective Access Method 1

In order to achieve a high throughput (HT) requisite for IEEE 802.11 VHT, a wide bandwidth (for example, 80 MHz) should be used. However, since devices requisite for the legacy system such as IEEE 802.11a/b/g/n are configured to use a channel, it is difficult for the devices to search for empty contiguous 80 MHz channels. In order to overcome this difficulty, non-contiguous channels may be aggregated and used as necessary. In order to use a channel bandwidth of 80 MHz or higher by aggregating non-contiguous channels, an access mechanism for some parts of the aggregated channels is needed.

On the contrary, M2M, smart grid application, etc. in which low rate, low power, and broadband communication are required may appropriately utilize a narrowband channel. In the legacy WLAN system, a channel bandwidth of 20 MHz, 40 MHz, 80 MHz or 160 MHz may be defined and used. This communication scheme may be referred to as a wideband channel access scheme.

That is, the narrowband channel access scheme proposed by the present invention is characterized in that it can use a smaller-sized channel bandwidth (for example, 0.5 MHz, 1 MHz or 2 MHz) smaller than a minimum unit of a legacy WLAN channel bandwidth. In addition, the term "narrowband channel" may refer to some parts of a bandwidth of one basic channel unit, and may also be referred to as a sub-channel as necessary.

The communication scheme using a sub-channel or a narrowband channel has not yet been defined. The embodiment of the present invention provides a narrowband channel access (or sub-channel access) mechanism for use in IEEE 802.11 WLAN.

A channel access scheme for use in the case in which the legacy WLAN system (for example, IEEE 802.11a/n/ac system) uses a broadband channel such as 20 MHz, 40 MHz, 80 MHz or 160 MHz.

Figure 10:
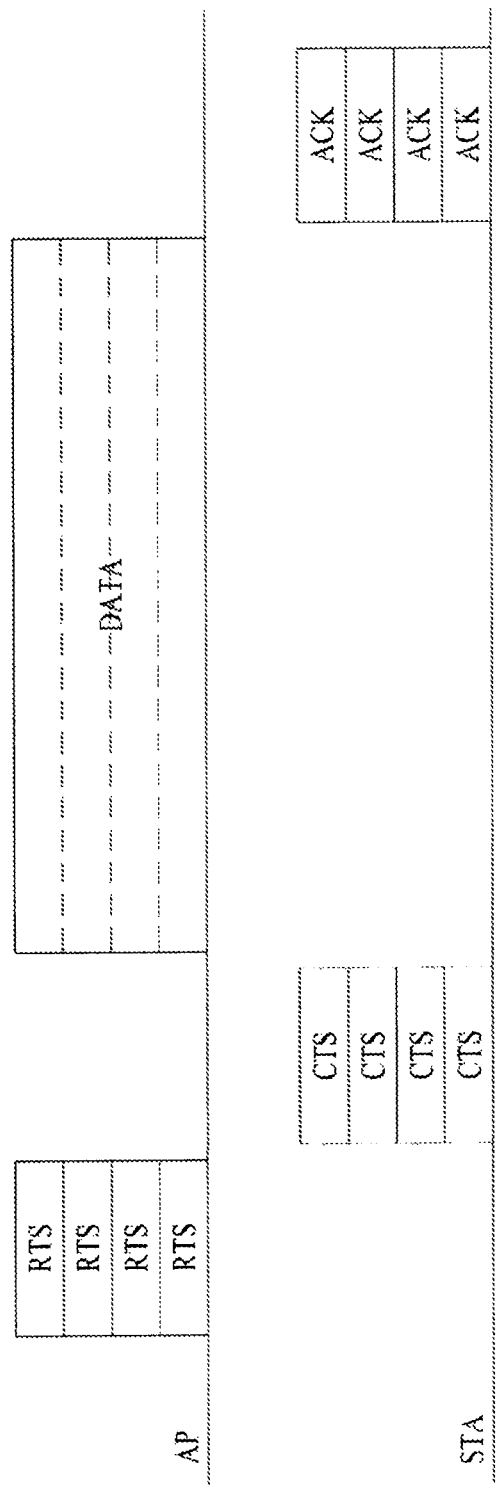
FIG. 10 is a conceptual diagram illustrating a broadband channel access mechanism employing a 80 MHz channel bandwidth.

FIG. 10 is a conceptual diagram illustrating a broadband channel access mechanism employing a 80 MHz channel bandwidth.

Prior to transmission of the 80 MHz data frame, the AP may transmit an RTS frame configured to use the 20 MHz channel bandwidth to each of 20 MHz channels. That is, in association with the 80 MHz channel bandwidth, a total of four RTS frames can be transmitted in the form of a duplicated PPDU.

A station (STA) may answer each 20 MHz channel in which RTS frames transmitted from the AP have been successfully received using a CTS frame configured to use the 20 MHz channel bandwidth. If the STA has successfully received RTS frames from the entire 80 MHz bandwidth, a total of four RTS frames can be transmitted to cover the 80 MHz channel bandwidth.

If the AP receives all the CTS frames related to the 80 MHz channel (i.e., if the AP receives a total of four CTS frames), a DATA frame can be transmitted using the 80 MHz channel bandwidth.

The STA having received the DATA frame can recognize whether the DATA frame has been successfully received using the ACK frame, and can output a message indicating the recognized result.

In a system configured to use a broadband channel shown in FIG. 10, each sub-channel is composed of 20 MHz. Assuming that the sub-channel bandwidth is a narrowband such as 0.5 MHz, 1 MHz or 2 MHz, a frequency selective channel access shown in FIG. 11 is needed.

FIG. 11 is a conceptual diagram illustrating a quality of service (QoS) of a frequency.

Referring to FIG. 11, a channel quality (for example, Signal to Noise Ratio (SNR)) may be changed in response to a frequency. For example, assuming that a single certain channel (Channel N) includes four sub-channels (Sub-channel 0, Sub-channel 1, Sub-channel 2, Sub-channel 3), the best channel QoS may appear in a frequency corresponding to the sub-channel 0, and the worst QoS may appear in a frequency corresponding to the sub-channel 2. Assuming that different QoSs appear in respective frequency locations, this characteristic may be denoted by a frequency selective characteristic of the channel.

If there occurs a large difference in QoS for each sub-channel as shown in FIG. 11, it is preferable that one sub-channel having the best QoS be selected from among a plurality of sub-channels. This channel access scheme may be referred to as a frequency selective channel access scheme.

In order to apply the frequency selective channel access scheme to IEEE 802.11 WLAN, there is a need to perform a sub-channel probe operation for selecting a sub-channel having the highest QoS (for example, SNR) from among a plurality of sub-channels. If one channel unit of the legacy WLAN system includes a plurality of sub-channels, a primary channel from among the sub-channels is established, and the primary channel should be basically used. However, since a channel quality of the present invention is changed according to time or peripheral environment, the present invention proposes a method for accessing an arbitrary sub-channel having the best channel quality instead of accessing the primary channel, whereas the related art is always configured to access the primary channel.

The present invention proposes a sub-channel probe scheme using RTS/CTS frames. That is, one channel unit is divided into a plurality of sub-channels, the RTS frame is transmitted to each sub-channel, and one sub-channel having the highest SRN may be signaled through the CTS frame. Although the concept of FIG. 11 is similar to the concept of FIG. 10 in which the RTS frame is transmitted on multiple sub-channels contained in one channel unit, the CTS frame is transmitted only in some sub-channels having the highest channel quality according to the concept of FIG. 11, differently from CTS frame transmission shown in FIG. 10.

FIG. 12 is a conceptual diagram illustrating an exemplary CTS frame format according to an embodiment of the present invention.

FIG. 12 shows a method for establishing the values of 7 initial bits of a scrambling sequence of a PPDU configured to transmit the CTS frame. 'DYN_BANDWIDTH_IN_NON_HT' parameter may indicate whether a bandwidth for use in a non-HT (non high throughput) configuration is dynamically established.

If the 'DYN_BANDWIDTH_IN_NON_HT' parameter is not present, 5 initial bits (i.e., if a first bit is B), 5 bits B0 to B4) may be set to nonzero pseudo-random integer values of 5 bits when a non-HT channel bandwidth (CBW) is set to 20 MHz. If the non-HT channel bandwidth (CBW) is not set to 20 MHz, 5 initial bits may be set to pseudo-random integer values of 5 bits.

On the contrary, the last 2 bits (B5~B6) of the scrambling sequence may be set to a specific value indicating the size of NON-HT CBW, irrespective of the DYN_BANDWIDTH_IN_NON_HT value.

The present invention provides a method for allocating one bit from among 7 bits of the initial scrambling sequence of a PPDU for transmission of the CTS frame to a Null Padding Indication bit, when the 'DYN_BANDWIDTH_IN_NON_HT' parameter is present. FIG. 12 shows a method for allocating a fourth bit (B3) to the Null Padding Indication bit. In FIG. 12, the first 3 bits (B0~B2) may be reserved (Rsvd), and a fifth bit B4 may be set to a specific value indicating whether a bandwidth is dynamically or statically configured.

If the Null Padding Indication bit of the CTS frame is set to 1, a sub-channel through which the corresponding CTS frame is transmitted is not used for transmission of the DATA frame, and is padded with a null value.

Null padding of the sub-channel may indicate that no physical signal is transmitted on a specific sub-channel, or may indicate that a predetermined physical signal or a meaningless physical signal is transmitted on a specific sub-channel. For example, repeated transmission of the DATA frame using a predetermined signal may belong to the scope of Null Padding.

Therefore, if a sub-channel has a low SNR, the Null Padding Indication bit of the CTS frame transmitted to the corresponding sub-channel is set to 1, such that actual transmission of the DATA frame may not be achieved.

In accordance with another embodiment, a bitmap is added to the CTS frame such that the bitmap may indicate an SNR level of each sub-channel. For example, assuming that 2-level (low or high) SNR indication for four sub-channels is achieved, a bitmap having a total of 4 bits is added to the CTS frame. For example, assuming that a high SNR is encoded to the value of 1, and a low SNR is encoded to zero (0), and a first sub-channel has the highest SNR, a bitmap composed of [1000] may be contained in the CTS frame.

FIG. 13 is a conceptual diagram illustrating a narrowband channel access mechanism including a sub-channel probe operation according to an embodiment of the present invention.

In FIG. 13, an access point (AP) transmits the RTS frame on each sub-channel, and a station (STA) having received the RTS frame may perform a sub-channel probe process through the null padding indication bit of the CTS frame.

In FIG. 13, it is assumed that a second sub-channel has the highest SNR. Accordingly, in the case of the CTS frame transmitted on third and fourth sub-channels, the null padding indication bit is set to 1, and transmission of the DATA frame may be requested only for the second sub-channel.

The DATA frame is transmitted after exchange of the RTS/CTS frames. The DATA frame is transmitted using a second sub-channel decided by the sub-channel probe process based on RTS/CTS frames, and each of the first, third, and fourth sub-channels may be padded with a null value.

During transmission of the DATA frame, indication of a sub-channel through which the DATA frame is actually transmitted is re-requested. For this purpose, each PLCP preamble for the DATA frame is transmitted through all sub-channels although no data is transmitted. That is, the null padding indication bit contained in a PLCP preamble may indicate whether or not the DATA frame on a sub-channel required for transmission of the corresponding PLCP preamble is transmitted.

As can be seen from FIG. 13, the null padding indication bit may be set to zero (0) only in the PLCP preamble on a second sub-channel. The null padding indication bit of the PLCP preamble transmitted on the first, third, and fourth sub-channels may be set to 1.

As described above, the term 'null padding' may include that no physical signal is transmitted on a specific sub-channel, and may include that a predetermined physical signal or a meaningless physical signal is transmitted on a specific sub-channel. Considering coexistence with other systems, it is preferable that a predetermined or meaningless physical signal be used as 'null padding'.

Assuming that the DATA frame is transmitted using only one sub-channel, another system may not detect the use of the corresponding sub-channel. For example, a system dependent upon energy detection CCA may preferably transmit a physical signal (for example, a physical signal used as null padding) to other sub-channels other than a sub-channel used for actual DATA frame transmission. Total energy level may increase due to transmission of a physical signal on other sub-channels other than the actual data transmission sub-channel, such that the increased energy level may be beneficial to CCA detection.

Figure 14:
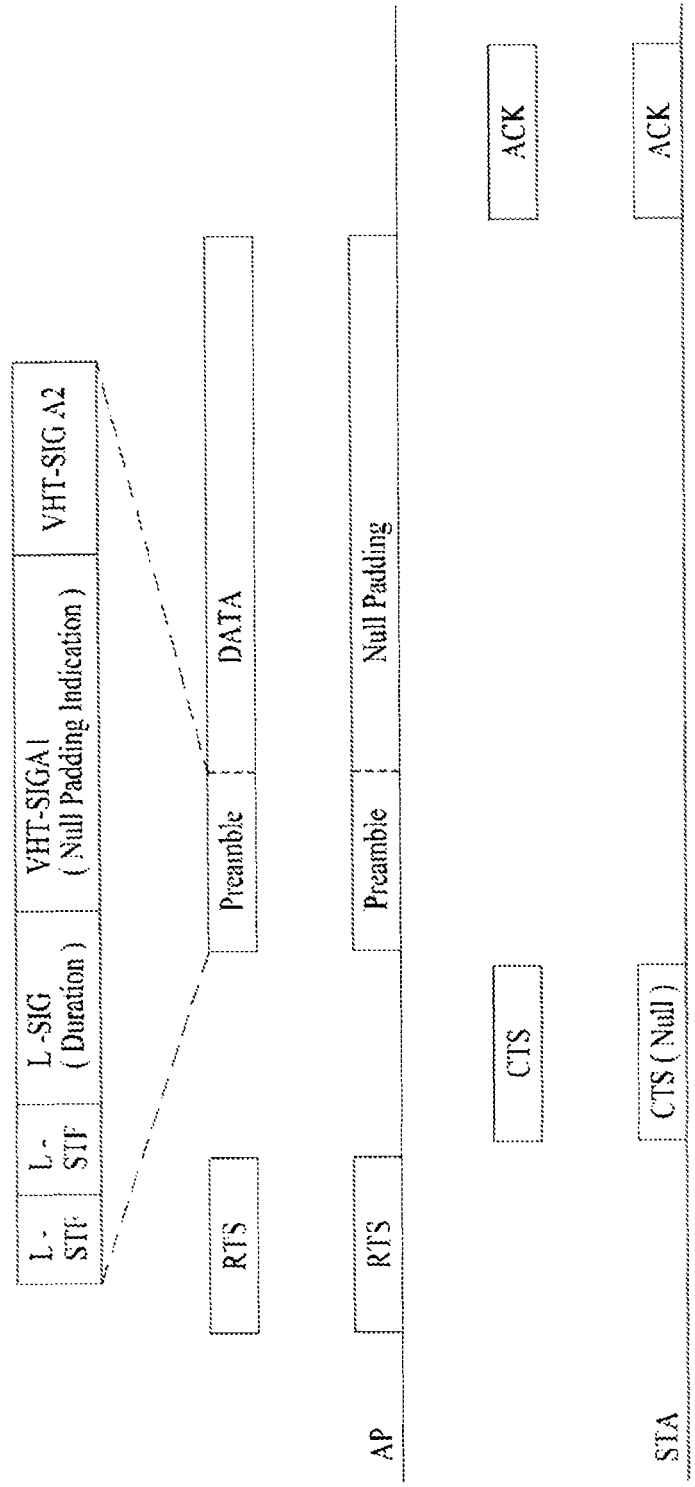
FIG. 14 is a conceptual diagram illustrating a narrowband channel access mechanism including a sub-channel probe operation according to another embodiment of the present invention.

FIG. 14 is a conceptual diagram illustrating a narrowband channel access mechanism including a sub-channel probe operation according to another embodiment of the present invention.

FIG. 14 shows exemplary non-contiguous sub-channels, differently from exemplary contiguous sub-channels shown in FIG. 13. In FIG. 14, it is assumed that a first sub-channel has a low SNR. Therefore, a null padding indication bit of the CTS frame transmitted on a first sub-channel is set to 1, and transmitted. The AP having received the CTS frame may transmit the DATA frame using the second sub-channel in which the null padding indication bit is set to zero (0).

Although FIGS. 13 and 14 exemplarily disclose the case in which only one sub-channel from among a plurality of sub-channels is used (i.e., the case in which there is used only one sub-channel in which the null padding indication bit is set to zero), the scope or spirit of the present invention is not limited thereto, and can also be applied to another case in which one or more sub-channels are used (i.e., the case in which there is used at least one sub-channel in which the null padding indication bit is set to zero) without departing from the scope or spirit of the present invention.

Sub-Channel Selective Access Scheme 2

Figure 15:
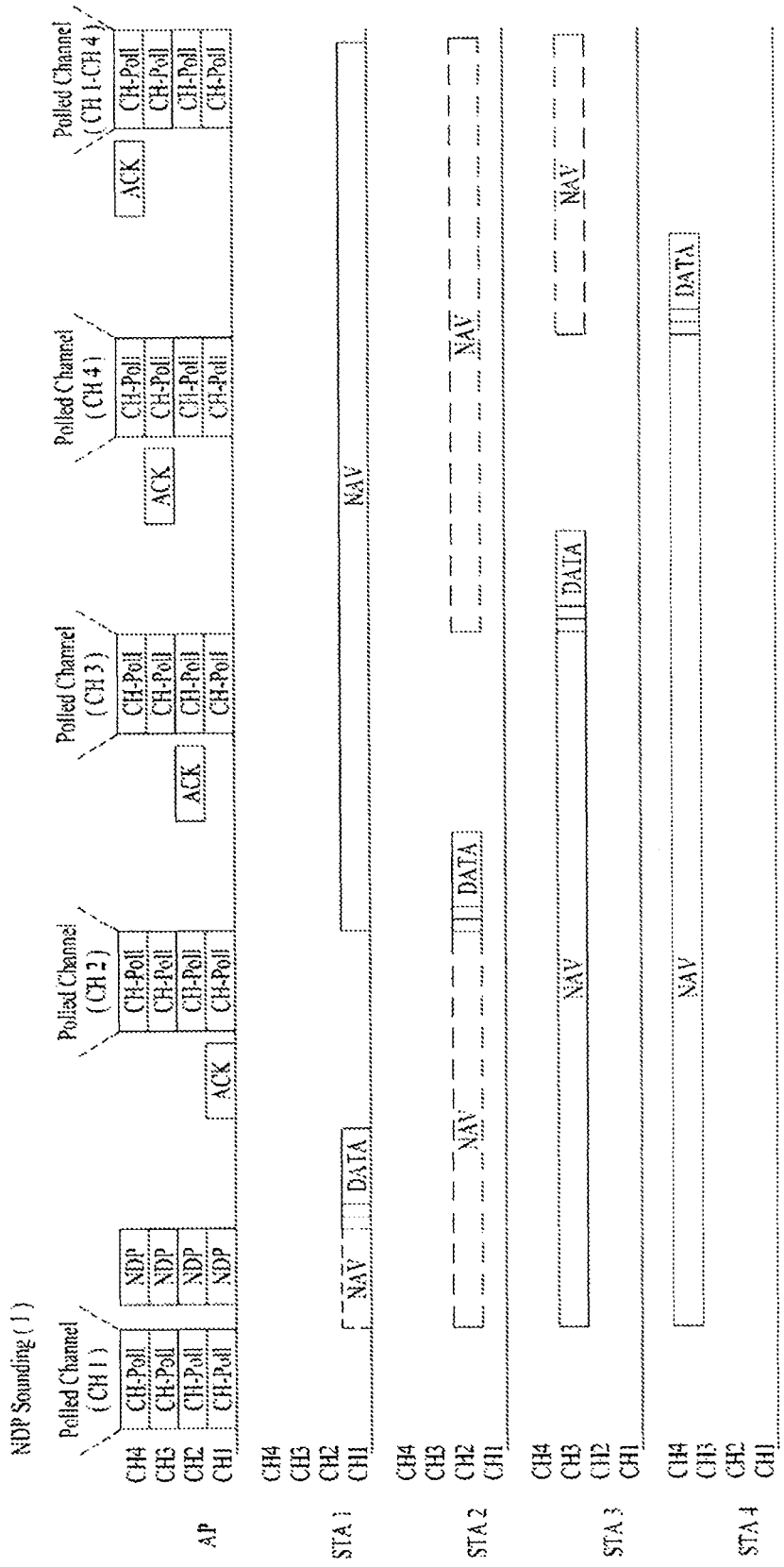
FIG. 15 is a conceptual diagram illustrating a sub-channel selective access scheme according to another embodiment of the present invention.

FIG. 15 is a conceptual diagram illustrating a sub-channel selective access scheme according to another embodiment of the present invention.

For narrowband channel (or sub-channel) access of FIG. 15, FIG. 15 shows a method for performing polling of each sub-channel. The term "sub-channel polling" may indicate that the STA can access the corresponding sub-channel (for example, STA having data to be used for uplink transmission can transmit data over the corresponding sub-channel). In other words, the term "sub-channel polling" may indicate that specific information indicating whether transmission of STAs is allowed on certain sub-channel(s) from among the set of the sub-channel is transferred to the corresponding STAs. Although the following embodiment defines a frame including polling information of a sub-channel as a CH-Poll frame for clarity of description, the scope or spirit of the present invention is not limited only to titles of a frame for sub-channel polling. That is, the CH-Poll frame used in the following description may indicate a frame including specific information indicating what one or more sub-channels in which transmission of STAs is allowed is.

According to the example of FIG. 15, the AP may perform NDP sounding only once for all the STAs, and STAs move (or switch) to a desired sub-channel so as to wait for data reception. Subsequently, the AP may perform polling of each channel, and may perform sub-channel access after the STA moved to the corresponding sub-channel receives the polling frame. In this case, NDP sounding may indicate that a receiver measures a quality of a channel (QoS) (i.e., a channel from the transmitter to the receiver) using the NDP frame received from the transmitter. If necessary, the NDP sounding may further indicate that the measured QoS is fed back to the transmitter.

In more detail, the AP may transmit the CH-Poll frame to the entire BSS bandwidth. The CH-Poll frame may be transmitted in the form of a duplicated PPCU through one or more sub-channels. In this case, one sub-channel may be understood to be a narrowband channel access unit. As can be seen from FIG. 15, sub-channels capable of being used as the sub-channel selective access within a BSS may be CH1, CH2, CH3, and CH4, and the CH-Poll frame is transmitted over all of the four sub-channels.

In addition, the CH-Poll frame may include an NDP Sounding field. The NDP sounding field may indicate whether the NDP frame is transmitted in subsequent to the CH-Poll frame. For example, in order to indicate that the NDP frame is transmitted after the CFI-Poll frame, the NDP Sounding field may be set to 1.

When the AP initially transmits the CH-Poll frame, the NDP Sounding field is set to 1 and transmitted, and the NDP frame may be transmitted to STAs after lapse of PCF interframe space (PIFS). FIG. 15 exemplarily shows that the NDP Sounding field of the CH-Poll frame initially transmitted by the AP is set to 1.

Assuming that STAs receive the CH-Poll frame and the NDP Sounding field is set to 1, the STAs can recognize that the NDP frame will be transmitted after lapse of a PIFS subsequent to the CH-Poll frame. STAs may measure a quality of each sub-channel using the NDP frame. Although FIG. 15 exemplarily shows that NDP frames are simultaneously transmitted through multiple sub-channels, the scope or spirit of the present invention is not limited thereto, each NDP frame is transmitted once at only one sub-channel, and NDP frames can be sequentially transmitted throughout different sub-channels (See the example shown in FIG. 19). The example of FIG. 15 is disclosed for simple NDP frame transmission, STA1 may measure a channel quality of each sub-channel using the NDP frame on the basis of data received from the AP, and other STAs may measure a channel quality of each sub-channel.

Each STA having received the NDP frame may select one or more sub-channels to be used by each STA on the basis of the channel quality measurement result. In addition, each STA may move to (or switch to) the selected sub-channel, and may wait for a predetermined time on the moved (or switched) sub-channel. If the STA is in the standby mode on a sub-channel, this means a standby mode of the STA that enables the AP to perform polling the corresponding sub-channel so as to perform triggering of channel access. In addition, while the STA waits for channel access, the STA may establish NAV so that a standby mode can be maintained.

After the AP transmits the CH-Poll frame and NDP frame(s), the AP sequentially or arbitrarily moves among individual sub-channels, so that it can perform polling on each sub-channel. For example, the AP may transmit the CH-Poll frame throughout the entire BSS bandwidth so as to perform polling. In this case, the CH-Poll frame may be transmitted in the form of a duplicated PPDU, and the NDP sounding field for use in the CH-Poll frame purposed only for polling may be set to zero. In addition, the CH-Poll frame may include a 'Polled Channel' field. The Polled Channel field may be set to a specific value indicating which sub-channel is polled by the AP.

For example, as can be seen from FIG. 15, the Polled Channel field of the first CH-Poll frame may be set to CH1. Accordingly, STA(s), each of which decides that a CH1 from among four sub-channels has the highest channel quality and is in the standby mode in the CH1, receive(s) the CH-Poll frame and confirm(s) the polled channel value. If CH1 is decided, each STA may reset the established NAV and then attempt to perform channel access. Here, attempting the channel access may indicate that the STA attempts to transmit the DATA frame after completion of a backoff action in the corresponding sub-channel. FIG. 15 exemplarily shows that STA1 transmits the DATA frame by accessing the DATA frame after completion of the backoff action. The AP having received the DATA frame from the STA1 in CH1 may transmit the ACK frame in the CH1 after lapse of a Short Inter-Frame Space (SIFS).

For example, from the viewpoint of the STA having received the CH-Poll frame, the STA may confirm a value of the Polled Channel field of the CH-Poll frame. If the corresponding sub-channel is identical to the confirmed result, the STA may reset the NAV and attempt channel access. If the corresponding sub-channel is not identical to the confirmed result, the STA may establish the NAV and defer channel access. In order to allow the STA to establish the NAV, the CH-Poll frame may include a Polled Channel Duration field. A Polled Channel Duration value may indicate a channel access allowed time of the STA related to the polled sub-channel. Accordingly, the STA staying in a standby mode of a sub-channel not corresponding to the polled channel may establish the NAV by a predetermined value indicated by the Polled Channel Duration field.

The AP may represent that a polled channel is denoted by CH2 simultaneously while sending the second CH-Poll frame. Accordingly, STA(s) having decided that CH2 from among four sub-channels has the highest channel quality, may reset the NAV, and may attempt to transmit the DATA frame after passing through a backoff operation in the corresponding sub-channel. FIG. 15 shows that STA2 may access the CH2 after completion of the backoff operation, and transmit the DATA frame. Other STAs may establish the NAV on the basis of the polled channel duration value of the CH-Poll frame. The AP having received the DATA frame from the STA2 at CH2 may transmit the ACK frame over the CH2 after lapse of the SIFS time.

Here, a sub-channel selective access start time of the STA may be decided on the basis of information contained in the CH-Poll frame. A channel access start time, at which the STA having selected at least one sub-channel from among sub-channel(s) indicated by the polled channel in the CH-Poll frame starts access on the at least one sub-channel, may be decided on the basis of information contained in the CH-Poll frame. For example, If the NDP Sounding field is set to 1, the NDP frame is transmitted in subsequent to the CH-Poll frame, and the STA may attempt to perform access on the sub-channel after completion of transmission of NDP frame(s). Alternatively, if the NDP Sounding field is set to zero, the NDP frame is not transmitted in subsequent to the CH-Poll frame, the STA does not wait for receiving the NDP frame and attempts access on the sub-channel. Of source, the STAs having selected the sub-channel not indicated by the polled channel in the CH-Poll frame may establish the NAV, and may not attempt to access a sub-channel on the polled channel.

In the example of FIG. 15, CH3 is polled at a third CH-Poll frame, CH4 is polled at a fourth CH-Poll frame, and a detailed description thereof is similar to the above-mentioned first and second CH-Poll frames, and as such a detailed description thereof will herein be omitted for convenience of description.

As can be seen from FIG. 15, all sub-channels (CH1~CH4) are polled at the fifth CH-Poll frame, and this means that the sub-channel access operation is ended. Alternatively, instead of using the CH-Poll frame, the CF-END frame is transmitted on all sub-channels, and the NAV reset is explicitly indicated, such that the sub-channel access operation can be ended. Subsequently, a general polling operation or a channel access operation for the legacy basic channel unit but not the sub-channel may be carried out.

FIG. 16 is a conceptual diagram illustrating a CH-Poll frame format according to an embodiment of the present invention.

In the CH-Poll frame format of FIG. 16, the frame control (FC) field may include control information requisite for frame transmission/reception.

The duration field may be set to a specific time for transmitting the corresponding frame or the like. In the example of the present invention, the duration field may be set to the above-mentioned polled channel duration value (i.e., a channel access allowed time of the STA in association with the polled sub-channel). NAVs of other STAs may be established on the basis of the value of the duration field.

The receiver address (RA) field may be set to a broadcast value (for example, a wildcard value or a predetermined value). If the AP may command a specific STA to perform selective access at a specific sub-channel, the RA field value may be set to an MAC address of the specific STA.

The transmitter address (TA) field may be set to a BSSID value indicating an MAC address of the AP configured to transmit the CH-Poll.

The Polled Channel field may be set to a specific value indicating a number (or index) of the channel(s) polled by the CH-Poll frame. Here, the Polled Channel field may be composed of a list of a plurality of channels. For example, the last CH-Poll frame shown in the example of FIG. 15 may indicate that CH1, CH2, CH3, and CH4 are polled. In this case, the Polled Channel field may have a channel list format indicating a plurality of sub-channels.

The NDP Sounding field may indicate whether the NDP frame is transmitted in subsequent to the CH-Poll frame. For example, in order to indicate that the NDP frame is transmitted after lapse of the CH-Poll frame, the NDP Sounding field may be set to 1.

A FCS field may be a Frame Check Sequence (FCS) field.

In accordance with the polled-scheme sub-channel selective access scheme, the STA need not inform the AP of specific information indicating which sub-channel was selected by the STA. Feedback signaling overhead is reduced so that the total system throughput may increase. In addition, predetermined scheduling is not used according to the STA traffic amount, the AP may arbitrarily (or dynamically) change a service time of each sub-channel, such that efficiency of system resource utilization can be increased.

FIG. 17 is a conceptual diagram illustrating a method for transmitting multiple NDP frames to support sub-channel selective access according to an embodiment of the present invention.

If the STA does not simultaneously measure the channel quality on all sub-channels, the STA must measure the channel quality for each sub-channel. For example, the STA may receive the NDP frame on a single sub-channel, measure a channel quality of the corresponding sub-channel, and then measure the channel quality using the NDP frame in another sub-channel. In other words, the AP must transmit multiple NDP frames at different times. For example, when the AP performs channel quality measurement of four sub-channels, it may sequentially (or contiguously) transmit the four NDP frames in a time domain.

For example, in order to enable a certain STA to measure the channel quality of four sub-channels, the STA may switch (or move) to CH1 during transmission of the first NDP frame, such that it can measure the channel quality of the CH1. Thereafter, during the transmission time of the second, third, and fourth NDP frames, the STA may switch (or move) to CH2, CH3, and CH4 so as to sequentially measure channel qualities of CH2, CH3, and CH4. However, the scope of the embodiment is not limited to the order of CH1→CH2→CH3→CH4, and measurement of the channel quality of one sub-channel from among multiple sub-channels may be performed during the transmission time of one NDP frame.

A NDP Announcement (NDPA) frame may be transmitted prior to transmission of the NDP frame from the AP. The NDPA frame may be a PPDU frame indicating that the NDP frame will be followed. The AP transmits the NDPA frame and then transmits the NDP frame after lapse of the SIFS interval. For transmission of multiple NDP frames, the NDPA frame may include information regarding a channel bandwidth of the NDP frame and information regarding the number of NDP frames contiguously transmitted.

The example of FIG. 17 indicates that four contiguous NDP frames are transmitted over the bandwidths of CH1~CH4 through the NDPA frame, and four NDP frames are transmitted subsequent to the NDPA frame.

FIG. 18 is a conceptual diagram illustrating a method for performing sub-channel selective access according to a modification example of the present invention.

As shown in the examples of FIGS. 15 to 17, the effect of the sub-channel selective access scheme based on channel polling may increase when many STAs attempt to use selective channel access.

However, assuming that a small number of STAs attempts to use frequency selective channel access, if many sub-channels not selected by the STA are present when the AP performs polling in all sub-channels, this means that unnecessary channel polling is performed, such that overhead caused by channel polling may increase. For example, if a wakeup schedule of a specific STA is established by the AP, the corresponding STA directly transmits a desired sub-channel to the AP, such that frequency selective channel access may be more efficient than the channel polling scheme.

In the example of FIG. 18, the AP may transmit the NDPA frame and the NDP frame at intervals of an SIFS interval. The STA having received the NDPA frame and the NDP frame may select one or more sub-channels to be used for data frame transmission on the basis of the channel quality measurement result.

The STA in which sub-channel selective access is not allowed must transmit data using a primary channel in the same manner as in the related art. Therefore, the STA may transmit a Channel Switch Request frame to the AP over a primary channel. The Channel Switch Request frame may include specific information indicating which sub-channel is selected by the STA. The AP having received the Channel Switch Request frame may transmit a channel switch response frame to the STA over a primary channel.

The STA and AP having successfully transmitted/received the channel switch request frame and the channel switch response frame may move (or switch) to the selected sub-channel. In the moved (or switched) sub-channel, the STA and AP may perform transmission/reception of the data frame and the ACK frame.

In order to allow the STA and AP to move (or switch) to the selected channel, a switch time should be determined. Information regarding the switch time may be contained in the channel switch request frame. For example, when specific information indicating which sub-channel is selected is transmitted from the STA to the AP, switch time information required for switching (or moving) to the selected sub-channel can also be transmitted to the AP.

The AP having received the channel switch request frame including the switch time information transmits the channel switch response frame to the STA, and can communicate with the corresponding STA using the selected sub-channel after lapse of the switch time.

If a predetermined time needed for the STA moving (or switching) to the selected sub-channel is shorter than another time needed for the AP moving (or switching) to the selected sub-channel, the switch time information established by the AP may be contained in the Channel Switch Response frame. In this case, the STA may communicate with the AP using the selected sub-channel after lapse of the switch time contained in the Channel Switch Response frame.

In addition, the Channel Switch Request frame may include duration information. The duration information requested for the AP may indicate that the STA will use the selected sub-channel during only a specific time corresponding to the duration value contained in the Channel Switch Request frame. After lapse of a specific time corresponding to the duration value, the AP may come back to the primary channel so that it can prepare for communication with other STAs.

The duration information may also be contained in the Channel Switch Response frame. A duration value contained in the channel switch response frame may be a specific value obtained when the SIFS and a transmission time of the channel switch response frame are subtracted from the duration value of the channel switch request frame. Therefore, other STAs may confirm a duration value of the Channel Switch Request frame and a duration value of the Channel Switch Response frame, and thus defer a channel access by establishing an NAV corresponding to a specific time corresponding to the confirmed result.

Instead of the Channel Switch Request frame and the Channel Switch Response frame shown in FIG. 18, the RTS frame and the CTS frame may be used. Here, the RTS frame may include specific information indicating a sub-channel selected by the STA, switch time information, and duration information. In addition, the CTS frame may include switch time information and duration information.

FIG. 19 is a conceptual diagram illustrating a method for transmitting multiple NDP frames to support sub-channel selective access according to another example of the present invention.

FIG. 19 shows a method for transmitting the NDP frame through one sub-channel by the AP, and then transmitting the NDP frame through another sub-channel. In FIG. 19, the set of sub-channels operating in a BSS is composed of CH1~CH8, and STA transmission may be possible on four sub-channels CH5~CH8 from among the channels CH1~CH8. In this case, assuming that channel qualities of the four sub-channels are measured, the four sub-channels can be sequentially transmitted in a time domain (however, at intervals of a PIFS disposed between contiguous NDP frames). The STA may move (switch) to the corresponding sub-channel in response to the NDP frame transmission, such that channel quality measurement of each sub-channel can be carried out.

FIG. 19 shows that specific information (i.e., Channel Activity Bitmap) indicating which sub-channel is allowed for STA transmission is transferred from the AP to the STA through a beacon frame. That is, although the frame indicating what at least one sub-channel allowed for STA transmission is refers to the CH-Poll frame, the present invention provides a method for providing the above information through the beacon frame.

The AP may inform the STA of information related to Sounding NDP frame transmission.

Although the example of FIG. 17 has disclosed that the number of NDP frames and bandwidth information are transferred to the STA through the NDPA frame, the example of FIG. 19 shows a method for providing such information through a beacon frame. In more detail, a sounding start channel, a sounding NDP bandwidth, and the number of sounding NDPs may be transferred to STAs through the beacon frame. The sounding start channel may represent a channel (e.g., CH5) from which sounding starts. Although the example of FIG. 19 shows the case in which a channel index starts from '1' (i.e., the case in which a first channel is indexed to CH1), if the channel index starts from zero (0) and a value of the sounding start channel is set to N, this means that sounding starts from the (N+1)-th channel. The sounding NDP bandwidth may indicate a channel bandwidth of the sounding NDP frame. The example of FIG. 19 shows that the bandwidth of one NDP frame transmitted for sounding purpose is identical to the bandwidth (for example, 2 MHz bandwidth) of one sub-channel. The number of sounding NDPs indicates the number of sounding NDP transmission times. The example of FIG. 19 shows that four sounding NDPs are sequentially transmitted at intervals of a specific time corresponding to a PIFS.

In accordance with another example of FIG. 19, information of a Channel Activity Bitmap and information of a Maximum Transmission Width can be transmitted to STAs through the beacon frame. Here, the above sounding start channel, the sounding NDP bandwidth, and the number of sounding NDPs may not be contained in a beacon frame.

The Channel Activity Bitmap may indicate that a channel list (or one or more sub-channels) used as a sounding target is indicated in the form of a bitmap. FIG. 19 shows that sounding target channels are determined to be CH5~CH8. The example of FIG. 19 may indicate that a sounding target is a sub-channel and STA transmission is allowed in the corresponding sub-channel. In the example of the present invention, each bit of the Channel Activity Bitmap may correspond to one sub-channel having a 2 MHz bandwidth, and indicate whether UE transmission/reception for the corresponding 2 MHz sub-channel is achieved.

The Maximum Transmission Width may represent a channel width of one sounding NDP frame. FIG. 19 shows the exemplary case in which the 2 MHz NDP frame is transmitted for sounding purpose. In this case, the maximum transmission width information may be set to a specific value indicating the 2 MHz NDP frame.

The number of sounding NDP transmission times is not explicitly provided as shown in the above-mentioned example, and may be indirectly/implicitly decided by the Channel Activity Bitmap and the Maximum Transmission Bandwidth. For example, the channels CH5~CH8 are sub-channels serving as the sounding target, the bandwidth of one sub-channel is 2 MHz, such that execution of the sounding for the entire 8 MHz bandwidth is decided. In addition, since one sounding NDP frame has a width of 2 MHz (i.e., the same size as that of one sub-channel bandwidth), four sounding NDP frames can be transmitted (or the sounding NDP frame can be transmitted four times).

Figure 20:
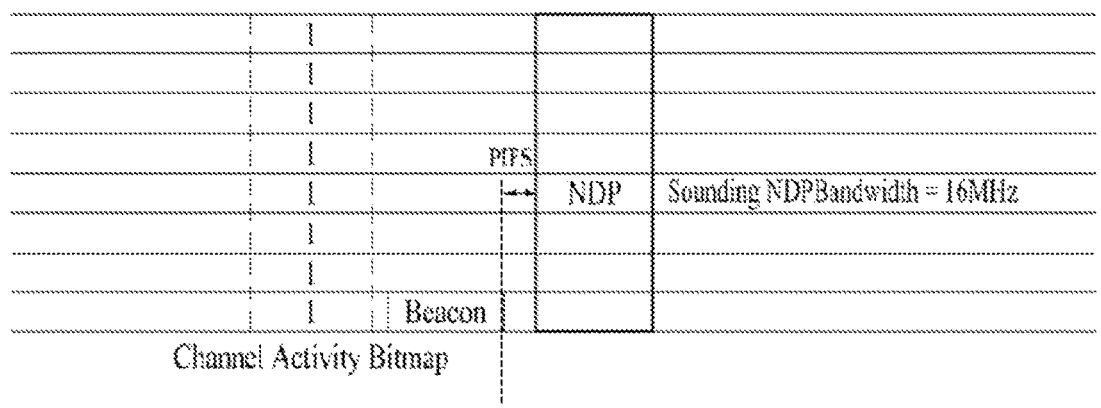
FIG. 20 is a conceptual diagram illustrating a method for transmitting multiple NDP frames to support sub-channel selective access according to another example of the present invention.

FIG. 20 is a conceptual diagram illustrating a method for transmitting multiple NDP frames to support sub-channel selective access according to another example of the present invention.

In FIG. 20, the Channel Activity Bitmap transmitted through the beacon frame includes the set (i.e., CH1-CH8) of sub-channels operating in a BSS, and STA transmission is possible in all of the channels CH1-CH8. In this case, one sounding NDP frame for covering the channels CH1-CH8 can be transmitted. The AP may inform the STA of information related to such sounding NDP frame transmission.

As one example of FIG. 20, the sounding start channel, the sounding NDP bandwidth, and information regarding the number of sounding NDPs may be provided to the STA through the beacon frame. In this case, the sounding start channel information may indicate a first sub-channel (if the channel index starts from '1', the sounding start channel information may indicate a CH1. In addition, the sounding NDP bandwidth information may indicate that one NDP frame transmitted for sounding purpose has a 16 MHz bandwidth. Information regarding the number of sounding NDPs may indicate the value of 1, and this means that the sounding NDP frame is transmitted only once at intervals of a PIFS time after lapse of the beacon frame.

As another example of FIG. 20, the Channel Activity Bitmap information and the Maximum Transmission Width information may be transmitted through the beacon frame. Here, the beacon frame may not include the above sounding start channel, the sounding NDP bandwidth, and information regarding the number of sounding NDPs. The Channel Activity Bitmap may indicate that channels from the first channel to the 8$^{th}$ channel (i.e., CH1~CH8 when the channel index starts from '1') are used as sounding targets (i.e., STA transmission may be allowed in the corresponding sub-channel. In addition, the Maximum Transmission Width information may indicate that one NDP frame transmitted for sounding purpose has a 16 MHz bandwidth. Accordingly, although the number of sounding NDP transmission times is not explicitly indicated, the Channel Activity Bitmap and the Maximum Transmission Bandwidth may indirectly/implicitly indicate that the channels (CH1~CH8) are identical to sub-channels serving as sounding targets, one sub-channel has a 2 MHz bandwidth, and sounding execution is decided for the entirety of the 16 MHz bandwidth. In addition, since one NDP frame has a 16 MHz bandwidth, transmission of one sounding NDP frame may be decided (or the sounding NDP frame is transmitted once).

FIG. 21 is a conceptual diagram illustrating a method for transmitting multiple NDP frames to support sub-channel selective access according to another example of the present invention.

In FIG. 21, the channel activity bitmap transmitted through the beacon frame may exemplarily indicate that the set of sub-channels operating in the BSS is composed of CH1~CH8, and STA transmission is possible on four sub-channels CH5~CH8. Here, one sounding NDP frame for covering the channels CH5~CH8 can be transmitted. The AP may inform the STA of information related to such sounding NDP frame transmission.

As one example of FIG. 21, the sounding start channel, the sounding NDP bandwidth, and information regarding the number of sounding NDPs may be transferred to the STAs through the beacon frame. In this case, the sounding start channel information may indicate a fifth sub-channel (i.e., if the channel index starts from the value of 1, the sounding start channel information may indicate a CH5). In addition, the sounding NDP bandwidth information may indicate that one NDP frame transmitted for sounding purpose has a 8 MHz bandwidth. Information regarding the number of sounding NDPs may indicate the value of 1, and this means that the sounding NDP frame is transmitted only once at intervals of a PIFS time after lapse of a beacon frame.

As another example of FIG. 21, the Channel Activity Bitmap information and the Maximum Transmission Width information may be provided through the beacon frame. In this case, the above sounding start channel, the sounding NDP bandwidth, and information regarding the number of sounding NDPs may not be contained in the beacon frame. The Channel Activity Bitmap may indicate that channels from the fifth channel to the 8$^{th}$ channel (where, if the channel index starts from '1', the channel activity bitmap indicates CH5~CH8) are used as sounding targets (STA transmission is allowed in the corresponding sub-channel). In addition, the Maximum Transmission Width may indicate that one NDP frame transmitted for sounding purpose has a 8 MHz bandwidth. Accordingly, although the number of sounding NDP transmission times is not explicitly indicated, the Channel Activity Bitmap and the Maximum Transmission Bandwidth may indirectly/implicitly indicate that the channels (CH1~CH8) are identical to sub-channels serving as sounding targets, one sub-channel has a 2 MHz bandwidth, and sounding execution is decided for the entirety of the 16 MHz bandwidth. In addition, since one NDP frame has an 8 MHz bandwidth, transmission of one sounding NDP frame may be decided (or the sounding NDP frame is transmitted once).

As shown in the above-mentioned examples, the AP may inform the STA of specific information indicating whether the sounding NDP frame is transmitted after lapse of the beacon frame. If the sounding NDP frame is transmitted, the corresponding configuration information may be transferred to the STA through the beacon frame. Here, specific information indicating whether the sounding NDP frame is transmitted may explicitly indicate whether the sounding NDP frame is transmitted in the beacon frame, or may be implicitly indicated from information regarding the sounding NDP frame configuration. In addition, the sounding NDP frame configuration information may exemplarily include the Channel Activity Bitmap and the Maximum Transmission Width. Based on the above-mentioned information, specific information indirectly/directly indicating which one of sub-channels is used for the sounding NDP frame transmission and which one of PPDU bandwidths is used for the sounding NDP frame transmission.

The STA may select one or more sub-channels using the transmitted sounding NDP frame in consideration of the channel quality (for example, SNR).

NDP Frame Structure

Figure 22:
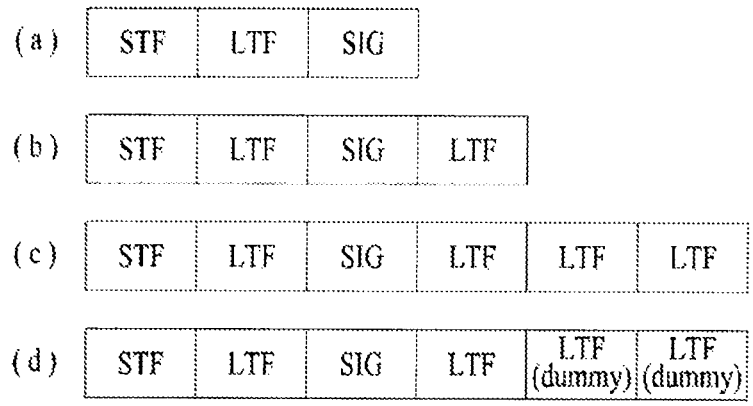
FIG. 22 is a conceptual diagram illustrating exemplary NDP frame formats according to an embodiment of the present invention.

FIG. 22 is a conceptual diagram illustrating exemplary NDP frame formats according to an embodiment of the present invention.

Generally, the number of LTFs transmitted to the NDP frame is decided by the number of supported spatial streams.

For example, if one spatial stream is supported, the NDP frame may be composed of STF, LTF, and SIG fields as shown in FIG. 22(a). If two spatial streams are supported, the NDP frame may be composed of STF, LTF, SIG and LTF fields as shown in FIG. 22(b). If four spatial streams are supported, the NDP frame may be composed of STF, LTF, SIG, LTF, LTF and LTF fields as shown in FIG. 22(c).

In the meantime, assuming that the STA performs channel quality measurement for each sub-channel simultaneously while moving between a plurality of sub-channels, a predetermined number of LTF fields higher than the number of supported spatial streams may be contained in the NDP frame. The remaining LTF field other than the LTF field corresponding to the number of supported spatial streams may be used as a dummy signal considering the STA channel switching time.

For example, if two spatial streams are supported, the NDP frame may be composed of STF, LTF, SIG, LTF, LTF and LTF fields as shown in FIG. 22(d). In this case, the last two LTF fields may be used as a dummy signal considering the STA channel switching time. In other words, the STA may move to another sub-channel during a specific time corresponding to the last two LTF fields.

In addition, the NDP frame may include a spatial stream field and the remaining NDP field. The spatial stream field and the remaining NDP field may be included as sub-fields of the SIG field of the NDP frame.

The spatial stream field may indicate the number of LTF fields contained in the corresponding NDP frame.

The remaining NDP field may indicate the number of NDP frame(s) to be transmitted after lapse of the corresponding NDP frame. For example, as shown in FIG. 17 or FIG. 19, a first NDP frame located subsequent to the NDPA frame or the beacon frame may be set to a specific value '3' indicating the presence of three remaining NDP fields (i.e., this means transmission of the second, third, and fourth NDP frames). The remaining NDP field of the fourth NDP frame may be set to a specific value indicating zero (0), because the fourth NDP frame is the last NDP frame and the subsequent NDP frame is not transmitted any longer.

Figure 23:
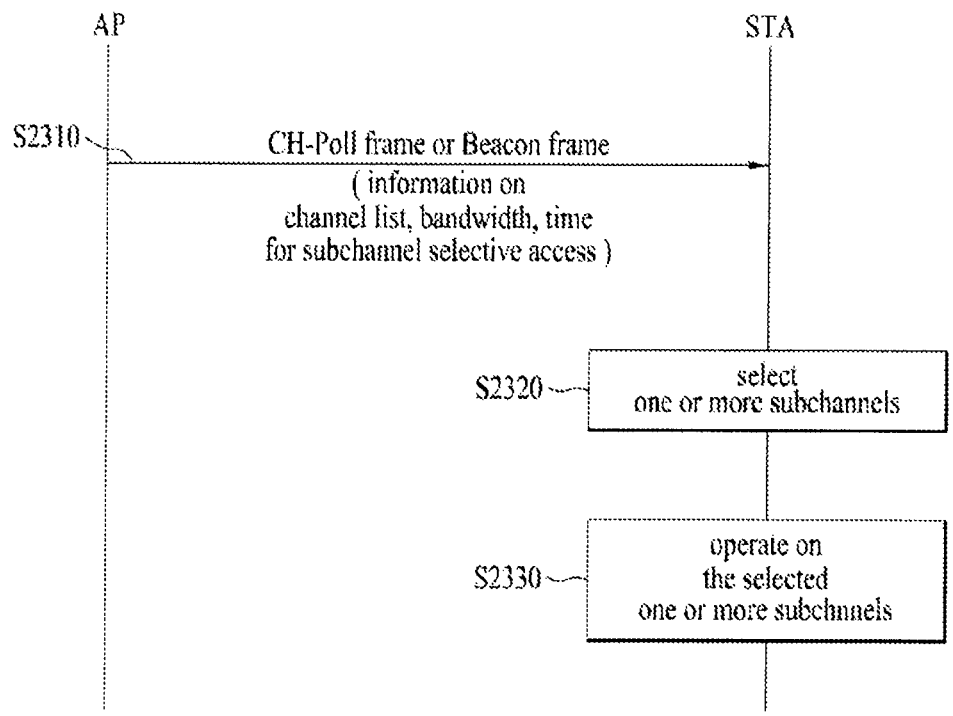
FIG. 23 is a flowchart illustrating a sub-channel selective access method according to one example of the present invention.

FIG. 23 is a flowchart illustrating a sub-channel selective access method according to one example of the present invention.

Referring to FIG. 23, the AP may transmit the CH-Poll or beacon frame to the STA in step S2310. Here, the AP may be an AP related to the STA. In addition, the CH-Poll frame or the beacon frame may include specific information for the sub-channel selective access (e.g., channel list field, bandwidth field, time field, NDP sounding field, etc.).

The channel list field (e.g., Channel Activity Bitmap) may indicate sub-channels in which STA access is allowed. The bandwidth field (e.g., Maximum Transmission Width) may indicate the bandwidth of a frame allowed in sub-channel(s) indicated by the channel list field. The time field (e.g., Polled Channel Duration) may indicate a channel access allowed time of the STA related to sub-channel(s) indicated by the channel list field. The NDP sounding field may indicate whether the sounding NDP frame is transmitted subsequent to the CH-Poll frame or the beacon frame.

In step S2320, the STA may select one or more sub-channels on the basis of information received through the CH-Poll frame or the beacon frame of step S2310. For example, although not shown in FIG. 23, the channel quality of sub-channels is measured using the NDP frame transmitted subsequent to the CH-Poll frame or the beacon frame, and one or more sub-channels can be selected on the basis of the measured result. Based on at least one of the channel list field, the bandwidth field, and the NDP sounding field, the STA may decide a sub-channel through which the NDP frame is transmitted subsequent to the CH-Poll frame or the beacon frame, and may also decide the bandwidth of the NDP frame and a transmission time of the NDP frame, such that the STA can receive the NDP frame.

In step S2330, the STA may operate in at least one sub-channel selected in step S2320 (for example, UL data is transmitted to the AP).

If the STA does not receive specific information for the sub-channel selective access or a frame including such information in step S2310, the STA must operate in the primary channel.

The sub-channel selective access method shown in FIG. 23 may be implemented such that above described various embodiments of the present invention may be independently applied or two or more embodiments thereof may be simultaneously applied.

Figure 24:
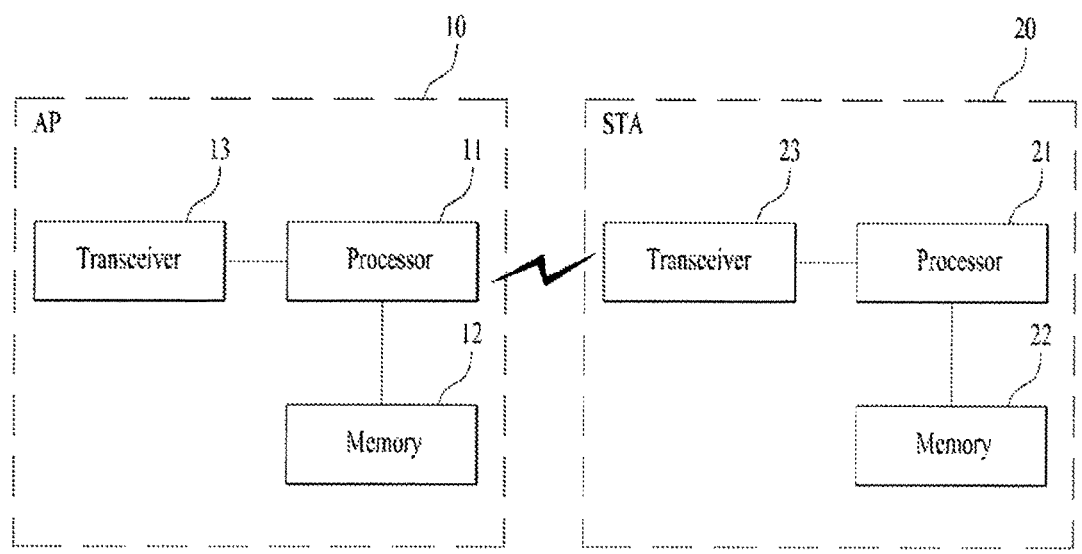
FIG. 24 is a block diagram illustrating a radio frequency (RF) device according to one embodiment of the present invention.

FIG. 24 is a block diagram illustrating a radio frequency (RF) device according to one embodiment of the present invention.

Referring to FIG. 24, an AP 10 may include a processor 11, a memory 12, and a transceiver 13. An STA 20 may include a processor 21, a memory 22, and a transceiver 23. The transceivers 13 and 23 may transmit/receive radio frequency (RF) signals and may implement a physical layer according to an IEEE 802 system. The processors 11 and 21 are connected to the transceivers 13 and 21, respectively, and may implement a physical layer and/or a MAC layer according to the IEEE 802 system. The processors 11 and 21 may be configured to operate according to the above described various embodiments of the present invention. Modules for implementing operation of the AP and STA according to the above described various embodiments of the present invention are stored in the memories 12 and 22 and may be implemented by the processors 11 and 21. The memories 12 and 22 may be included in the processors 11 and 21 or may be installed at the exterior of the processors 11 and 21 to be connected by a known means to the processors 11 and 21.

The AP 10 shown in FIG. 24 may transmit specific information supporting sub-channel selective access of the STA 20 to the STA 20. For example, the processor 11 of the AP 10 may control the AP 10 through the CH-Poll frame or the beacon frame, such that at least one of channel list information for sub-channel selective access, bandwidth information, time information, and NDP sounding information can be transferred from the AP 10 to the STA 20.

The STA 20 shown in FIG. 24 may perform sub-channel selective access. For example, the processor 21 of the STA 20 may select at least one sub-channel on the basis of information received from the AP 10 through the CH-Poll frame or the beacon frame, and may control the STA 20 to operate in the selected sub-channel. In addition, the processor 21 of the STA 20 may measure the channel quality of a sub-channel using the NDP frame transmitted subsequent to the CH-Poll frame or the beacon frame, such that it can control the STA 20 to select the at least one sub-channel on the basis of the measurement result. Configuration of the NDP frame transmission may be decided on the basis of the sub-channel selective access information contained in the CH-Poll frame or the beacon frame.

The overall configuration of the AP 10 and STA 20 may be implemented such that above described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

As is apparent from the above description, exemplary embodiments of the present invention may allow a device operating in a WLAN system to correctly perform/support efficient sub-channel selective access.

Although the above various embodiments of the present invention have been described based on an IEEE 802.11 system, the embodiments may be applied in the same manner to various mobile communication systems. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing sub-channel selective access using one or more sub-channels having a bandwidth of 2 MHz or less by a station (STA) in a wireless LAN (WLAN) system, the method comprising:
   receiving, by the STA from an access point (AP), a first frame including:
   a sounding indicator field indicating a first case in which the first frame is for sounding scheduling for the sub-channel selective access, or a second case in which the first frame is for scheduling activity by the AP for the sub-channel selective access, the sounding indicator field being a single field capable of indicating both of the first and the second cases;
   a channel list information field for the sub-channel selective access, the channel list information field has a single field value, and the single field value is differently used by the STA based on a value of the sounding indicator field; and
   a time information field for the sub-channel selective access,
   wherein, when the sounding indicator field has a first value, the single field value of the channel list information field indicates first sub-channels, the first sub-channels having the bandwidth of 2 MHz or less, the first sub-channels being the sub-channels where there is a sounding transmission activity from the AP to the STA for the sub-channel selective access, and when the sounding indicator field has a second value other than the first value, the single field value of the channel list information field indicates second sub-channels other than the first sub-channels, the second sub-channels having the bandwidth of 2 MHz or less, the second sub-channels being sub-channels where a data transmission, from the STA to the AP, is permitted for the sub-channel selective access;
   wherein, when the sounding indicator field has the first value, the method further comprises receiving, by the STA from the AP, a second frame in a form of a null data packet (NDP) sounding frame on the first sub-channels identified by the channel list information field of the first frame; and
   wherein, when the sounding indicator field has the second value, the method further comprises transmitting data, by the STA to the AP, through the second sub-channels identified by the channel list information field of the first frame.

2. The method according to claim 1, wherein, when the sounding indicator field has the second value, the first frame further includes a bandwidth information field indicating a bandwidth of a third frame allowed in the second sub-channels indicated by the channel list information field of the first frame.

3. The method according to claim 2, wherein the STA transmits data in a primary channel when at least one of the channel list information field, the bandwidth information field, and the time information field for the sub-channel selective access is not contained in the first frame.

4. The method according to claim 1, wherein the first frame is a CH-Poll frame or a beacon frame.

5. The method according to claim 1, wherein the first frame is transmitted from an access point (AP) associated with the STA.

6. A station (STA) for performing sub-channel selective access using one or more sub-channels having a bandwidth of 2MH or less in a wireless LAN (WLAN) system, the STA comprising:

a transceiver that receives, from an access point (AP), a first frame including:
  a sounding indicator field indicating a first case in which the first frame is for a sounding scheduling for the sub-channel selectivity access or a second case in which the first frame is for scheduling activity by the AP for the sub-channel selectivity access, the sounding indicator field being a single field capable of indicating both of the first and the second cases,
  a channel list information field for the sub-channel selective access, the channel list information field has a single field value and the single field value is differently used by the STA based on a value of the sounding indicator field, and
  a time information field for the sub-channel selective access; and
a processor that:
  identifies, when the sounding indicator field has a first value, first sub-channels, the first sub-channels having the bandwidth of 2 MHz or less, the first sub-channels are sub-channels where there is a sounding transmission activity from the AP to the STA for the sub-channel selectivity access by the channel list information field, and controls the transceiver to receive a second frame in a form of a null data packet (NDP) sounding frame from the AP on the first sub-channels identified by the single field value of the channel list information field, and
  identifies, when the sounding indicator field has a second value other than the first value, second sub-channels other than first sub-channels, the second sub-channels having the bandwidth of 2 MHz or less, the second sub-channels being sub-channels where a transmission, from the STA to the AP, is permitted for the sub-channel selectivity access indicated by the single field value of the channel list information field, and controls the transceiver to operate on the second sub-channels identified by the single field value of the channel list information field, when the sounding indicator field of the first frame has the second value.

* * * * *